Dec. 16, 1947.    G. E. DATH    2,432,729
RAILWAY CAR-END BUFFER
Filed Dec. 9, 1944
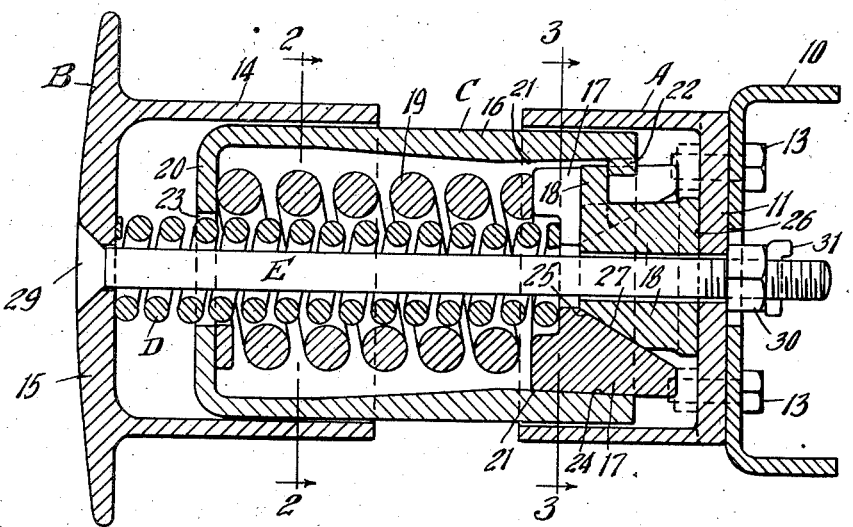
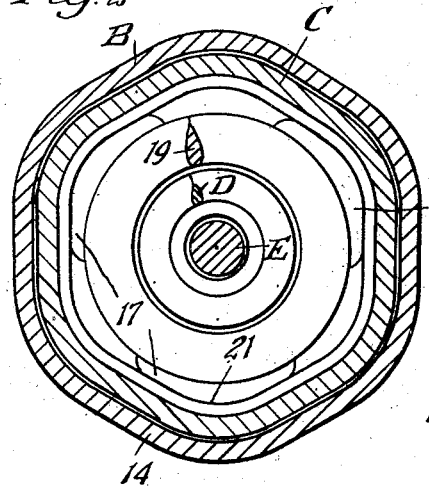
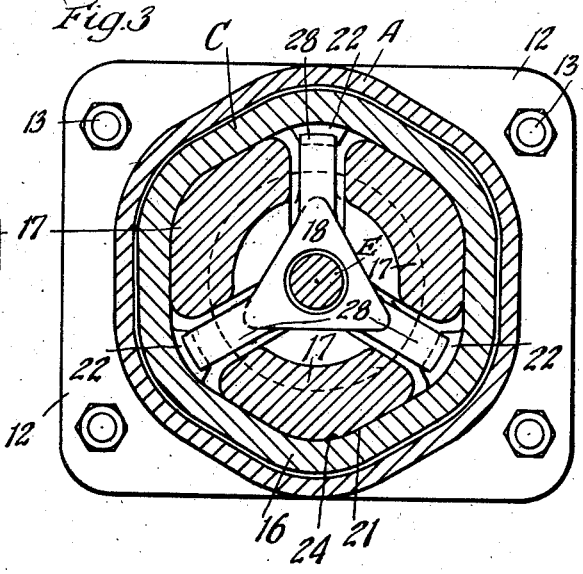
Inventor
George E. Dath
By Henry Fuchs
Atty.

Patented Dec. 16, 1947

2,432,729

UNITED STATES PATENT OFFICE 2,432,729

RAILWAY CAR-END BUFFER

George E. Dath, Mokena, Ill., assignor to W. H. Miner, Inc., Chicago, Ill., a corporation of Delaware Application December 9, 1944, Serial No. 567,426

5 Claims. (Cl. 213—221)

This invention relates to improvements in buffers for railway cars.

One object of the invention is to provide a simple and efficient buffer mechanism for railway cars having preliminary spring action to absorb the lighter shocks to which the mechanism is subjected in service, and frictional resistance to take care of the relatively heavier shocks.

A further object of the invention is to provide a buffer mechanism including a buffer housing secured to the end of the car, a buffer head movable inwardly toward the housing, a friction shock absorber adapted to be compressed between the buffer head and housing after a predetermined compression of the mechanism, to take care of the heavier shocks, and spring means operative during said predetermined compression of the mechanism for absorbing the lighter shocks.

A more specific object of the invention is to provide a mechanism as set forth in the preceding paragraph, wherein the friction shock absorber includes a friction casing closed at its front end and open at its rear end, a friction clutch including friction shoes having sliding frictional engagement within the open end of the casing and a wedge block for spreading the shoes apart, spring means within the casing yieldingly opposing inward movement of the shoes, the open end of the casing being slidingly telescoped within the housing and the wedge block being buttressed against the housing at the inner end thereof, wherein the buffer head is adapted to engage the casing and move the same inwardly of the housing after said predetermined compression of the mechanism to effect compression of the shock absorber and provide high frictional resistance to absorb the heavier shocks, and wherein the spring means for absorbing the lighter shocks is in the form of a central coil extending through the closed end of the friction casing, reacting between the buffer head and the friction clutch of the friction shock absorber, and is compressed between the buffer head and the housing during the time that the mechanism is compressed to said predetermined extent.

Other objects of the invention will more clearly appear from the description and claims hereinafter following.

In the drawing forming a part of this specification, Figure 1 is a longitudinal, vertical sectional view of my improved buffer mechanism, illustrating the same in position on the end of a railway car. Figures 2 and 3 are transverse, vertical sectional views, corresponding respectively to the lines 2—2 and 3—3 of Figure 1.

In said drawing, 10 indicates a portion of the end wall of a railway car, the portion illustrated being at one side of the center line of the car and having my improved buffer mechanism mounted thereon. As will be understood, the buffer mechanism is duplicated at the other side of the car and the two mechanisms cooperate in a well-known manner with a pair of similar buffer mechanisms on the end of an adjacent car.

My improved buffer mechanism proper, as shown in the drawing, comprises broadly a housing A; a buffer head B; a friction shock absorber unit C; a preliminary spring D; and a retainer bolt E.

The housing A is in the form of a shell of hexagonal, transverse cross section closed at its rear end by a vertical, transverse wall 11. The wall 11 is extended laterally outwardly beyond the sides of the housing, thereby providing flanges 12—12 for mounting the housing on the end of the car. The housing is secured to the end of the car by bolts 13—13 and 13—13 extending through the flanges 12—12 of the housing and the end wall 10 of the car.

The buffer head B comprises a hexagonal shell 14 which extends rearwardly from the head proper of the buffer, which head is indicated by 15. The head 15 forms a transverse front end wall of the hexagonal shell 14, and as shown projects laterally outwardly of the same. The hexagonal shell 14 corresponds in cross sectional size to the size of the housing A.

The friction shock absorber unit C includes a friction casing 16, three friction shoes 17—17—17, a wedge block 18, and a spring resistance 19.

The casing 16 is in the form of a tubular member of hexagonal, transverse, interior and exterior cross section. The casing 16 is closed at the front end by a transverse, vertical wall 20. The friction shock absorber unit C is interposed between the buffer head B and the housing A, the shell 14 of the buffer head being telescoped over the closed end of the casing and the housing A being telescoped over the open rear end of said casing. The hexagonal casing snugly fits the shell of the buffer head and the housing A for sliding movement, thus being held against rotation with respect to these members. At the open end thereof the casing 16 is provided with three interior, forwardly or inwardly converging, V-shaped friction surfaces 21—21—21. Between adjacent friction surfaces 21—21—21, the casing is provided with inwardly extending retaining lugs 22—22—22 at the open end thereof. In other words, the casing is provided with retaining lugs 22—22—22 located at alternate corners of the same. The transverse end wall 20 of the casing is provided with a central opening 23 for a purpose hereinafter described.

The friction shoes 17—17—17 are arranged symmetrically about the central longitudinal axis of the casing 16 and cooperate with the three friction surfaces of the latter. Each shoe has a longtiudinally extending, V-shaped friction surface 24 on the outer side thereof, which engages the corresponding friction surface 21 of the casing 16. As will be evident, the cooperating V-shaped friction surfaces of the friction shoes and casing hold the shoes against rotation with respect to the casing, confining the same to longitudinal movement. On the inner side, each shoe is provided with a flat wedge face 25 at the forward end thereof.

The wedge block 18, which is interposed between the shoes and the end wall 11 of the housing A, has a flat rear end face 26 which bears on said wall 11. At the inner end, the block 18 is provided with three wedge faces 27—27—27 arranged symmetrically about the longitudinal, central axis of the wedge and engaging respectively with the wedge faces 25—25—25 of the three shoes 17—17—17. At the inner or front end thereof, the block 18 is further provided with three radially extending lugs 28—28—28, which engage between adjacent friction shoes and cooperate with the lugs 22—22—22 of the casing 16 to limit outward movement of the wedge with respect to the casing and hold the parts of the friction shock absorber unit in assembled condition.

The spring resistance 19 is in the form of a relatively heavy, helical coil disposed within the casing 16 and having its front and rear ends bearing respectively on the end wall 20 of the casing and the inner or front ends of the friction shoes 17—17—17. The spring 19 serves to oppose inward movement of the friction shoes during compression of the shock absorber unit, thereby providing the desired high frictional resistance.

The preliminary spring D is in the form of a helical coil, which is lighter than the spring 19. The spring D is interposed between the friction clutch of the friction shock absorber unit C and the closed front end of the shell 14 of the buffer head B. As shown in Figure 1, the spring D is disposed within the spring 19 and extends through the opening 23 of the end wall 20 of the casing 16, having its front and rear ends bearing respectively on the transverse end wall 15 of the buffer head shell 14 and the front or inner ends of the shoes 17—17—17.

The retainer bolt E serves to hold the parts of the buffer mechanism assembled and limit the expansion of the same. The bolt E extends through the preliminary spring D and aligned openings in the wedge 18 and wall 11 of the housing A and is anchored at its front end to the buffer head B by a head 29 seated in a suitable pocket in the wall 15 of the shell 14 of the buffer head. At the rear end, the bolt E is provided with the usual nut 30, which bears on the transverse end wall 11 of the housing A. In order to prevent accidental removal of the nut 30, a key 31 is preferably provided which extends through the shank of the bolt. As will be seen upon reference to Figure 1, the end wall 10 of the car is suitably recessed to accommodate the nut 30 of the bolt.

In the normal position of the parts, the buffer head B has the wall 15 thereof spaced a predetermined distance from the front or closed end of the friction casing 16, thereby permitting a certain amount of compression of the preliminary spring D before the buffer head engages the closed end of the friction casing 16 to actuate the friction shock absorbing unit.

The operation of my improved buffer mechanism is as follows: Upon inward movement of the buffer head B through pressure exerted thereon by any object, such as the buffer head of an adjacent car, the head B is forced inwardly toward the housing A, compressing the spring D, thereby absorbing the lighter shocks. Upon further compression of the mechanism, the front end of the friction casing 16 is engaged by the end wall 15 of the shell 14 of the buffer head B, thereby forcing the friction shell rearwardly or inwardly of the housing A. Inasmuch as the wedge 18 of the friction clutch is buttressed against the closed end of the housing A, the friction shoes will be forced to slide lengthwise with respect to the friction casing against the resistance of the spring 19, thereby providing high frictional resistance between the friction shoes of the clutch and the casing. This action continues until the mechanism is fully compressed, inward movement of the buffer head with respect to the housing being limited by engagement of the buffer head with the front end of the housing. When the actuating force is removed, the spring D and the spring 19 of the friction shock absorber return all of the parts to their normal position, forward movement of the casing 16 of the friction shock absorber being limited by shouldered engagement of the lugs of the wedge 18 with the lugs of the casing and forward or outward movement of the buffer head B being limited by the retainer bolt E.

In this connection it is pointed out that the casing 16, shoes 17, wedge 18, and the spring 19 together form a complete friction shock absorbing unit which may be used independently of the buffer head B, housing A, and spring D. The complete shock absorber may be employed as the shock absorbing means of a railway draft rigging instead of forming a part of a buffer mechanism as hereinbefore described. In order to make use of the unit by itself, it is merely necessary to dismount the mechanism from the end of the car and remove the bolt E, buffer head B, housing A, and the preliminary spring D.

I claim:

1. In a buffer mechanism for railway cars, the combination with a friction casing open at one end and having a transverse abutment wall at the other end, said wall having an opening therethrough; of a friction clutch slidable within the open end of the casing; a shell slidingly telescoped over the open end of said casing, said clutch being buttressed against said shell; a second shell slidingly telescoped over the other end of the casing, said shells being movable toward and away from each other; a spring within the casing reacting between said transverse abutment wall thereof and said clutch; and a second spring extending through the opening of the transverse wall of the casing and reacting between the clutch and said second named shell to yieldingly oppose relative movement toward each other of said shell and clutch.

2. In a buffer mechanism for railway cars, the combination with a friction casing open at one end and partly closed at the other end by a transverse wall provided with a central opening; of friction shoes in sliding frictional engagement with the interior walls of said casing at the open end of the latter; a central wedge block in wedging engagement with the shoes; a spring within the casing bearing at the opposite ends on said shoes and the transverse wall of the casing and yieldingly opposing inward movement of the shoes; a shell closed at one end and open at the other end, the open end of said shell being slidingly telescoped over the open end of the casing, said wedge block bearing on the closed end of said shell; a second shell closed at one end and open at the other end, the open end of said second named shell being slidingly telescoped over the partly closed end of the casing, said closed end of said second named shell being normally spaced from the partly closed end of the casing; and a second spring within the casing extending through the opening of the transverse wall at the partly closed end thereof and bearing at opposite ends respectively on the closed end of the second named shell and the friction shoes.

3. In a buffer mechanism for railway cars, the combination with a housing fixed to the end of the car; of a friction casing open at its rear end and having a transverse end wall at its front end provided with an opening therethrough, the open end of the casing being slidingly telescoped within said housing; friction shoes in sliding engagement with the interior walls of said casing at the open end of the latter; a central wedge block held against inward movement with respect to the housing and having wedging engagement with the shoes; a spring within the casing bearing at opposite ends on the transverse wall of the casing and said shoes, yieldingly opposing movement of the shoes inwardly of the casing; a buffer head having a shell section slidingly telescoped over the front end of the casing; and a second spring extending through the opening of the transverse wall at the front end of the casing and reacting between the buffer head and the friction shoes.

4. In a buffer mechanism for railway cars, the combination with a housing fixed to the end of the car, said housing being closed at its inner end by a transverse wall; of a friction casing open at its rear end and partly closed at its front end by a transverse wall provided with a central opening therethrough, said open end of the casing being slidingly telescoped within the housing; friction shoes in sliding engagement with the interior of the casing at the open end thereof; a central wedge block interposed between the shoes and the transverse wall of the housing and having wedging engagement with the shoes, said wedge block being buttressed against said transverse wall of the housing; a spring within the casing having its front and rear ends bearing respectively on the transverse wall of the casing and the front ends of the shoes; a buffer head including a shell member extending rearwardly therefrom, said shell member being slidingly telescoped over the partly closed end of the casing; and a second spring within the casing extending through the opening of the transverse wall of the latter and bearing at its front and rear ends respectively on the buffer head and the friction shoes.

5. In a buffer mechanism for railway cars, the combination with a housing fixed to the end of the car; of a buffer head movable toward and away from said housing; a friction casing between said buffer head and housing, said casing having a transverse end wall provided with an opening at one end and being open at the other end; a friction clutch slidable within said casing and buttressed against the housing; and spring means within the casing including inner and outer springs, said outer spring reacting between the clutch and the casing and said inner spring extending through the opening of the transverse wall of the casing and reacting between the friction clutch and buffer head.

GEORGE E. DATH.

REFERENCES CITED

The following references are of record in the file of this patent:

UNITED STATES PATENTS

| Number | Name | Date |
|---|---|---|
| 2,146,015 | Hazeltine | Feb. 7, 1939 |